(12) United States Patent
Jung et al.

(10) Patent No.: US 8,842,251 B2
(45) Date of Patent: Sep. 23, 2014

(54) LIQUID CRYSTAL DISPLAY

(75) Inventors: Youn-Ho Jung, Asan-si (KR); Il-Koo Nah, Youngin-si (KR); Nam-Soo Kang, Asan-si (KR)

(73) Assignee: Samsung Display Co., Ltd. (KR)

( * ) Notice: Subject to any disclaimer, the term of this patent is extended or adjusted under 35 U.S.C. 154(b) by 1374 days.

(21) Appl. No.: 12/581,821

(22) Filed: Oct. 19, 2009

(65) Prior Publication Data
US 2010/0118023 A1    May 13, 2010

(30) Foreign Application Priority Data

Nov. 7, 2008    (KR) .................. 10-2008-0110600

(51) Int. Cl.
*G02F 1/1345*    (2006.01)
*G06F 1/16*    (2006.01)
*G02F 1/1335*    (2006.01)

(52) U.S. Cl.
CPC .......... *G06F 1/1601* (2013.01); *G02F 1/13452* (2013.01); *G02F 2001/133612* (2013.01)
USPC ............ 349/152; 349/149; 349/150; 349/151

(58) Field of Classification Search
USPC ...................... 349/58–65, 149–152
See application file for complete search history.

(56) References Cited

U.S. PATENT DOCUMENTS

| | | | |
|---|---|---|---|
| 2006/0125981 A1* | 6/2006 | Okuda | 349/110 |
| 2007/0263157 A1* | 11/2007 | Wu et al. | 349/150 |
| 2008/0106670 A1* | 5/2008 | Chang et al. | 349/58 |
| 2009/0322983 A1* | 12/2009 | Hashino | 349/61 |

* cited by examiner

*Primary Examiner* — Charles Chang
(74) *Attorney, Agent, or Firm* — Innovation Counsel LLP (57) ABSTRACT

Provided is a liquid crystal display (LCD) in which warping of a liquid crystal panel-driving printed circuit board (PCB) is reduced. The LCD includes: a liquid crystal panel; a lower housing which accommodates the liquid crystal panel; a lamp-driving PCB fixed to the lower housing; a reinforcing member which has one end fixed to at least one surface of the lamp-driving PCB and another end separated from the lamp-driving PCB; and a liquid crystal panel-driving PCB which includes a circuit-mounting board disposed outside the lower housing, wherein at least part of the circuit-mounting board is inserted between the lamp-driving PCB and the reinforcing member, so as to be at least partially supported by the lamp-driving PCB and the reinforcing member.

21 Claims, 8 Drawing Sheets

LIQUID CRYSTAL DISPLAY

This application claims priority to Korean Patent Application No. 10-2008-0110600 filed on Nov. 7, 2008 in the Korean Intellectual Property Office, the disclosure of which is incorporated herein by reference in its entirety.

BACKGROUND OF THE INVENTION

1. Field of the Invention

The present invention relates to a liquid crystal display (LCD), and more particularly, to an LCD with a liquid crystal panel-driving printed circuit board (PCB) having reduced warping.

2. Description of the Related Art

Liquid crystal displays (LCDs) are one of the most widely used flat panel displays (FPDs). An LCD typically includes two substrates, each having electrodes formed thereon, and a liquid crystal layer which is interposed between the two substrates. The LCD rearranges liquid molecules of the liquid crystal layer by applying voltages to selected electrodes, thus selectively creating opaque areas and generating a pattern of light passing through the liquid crystal layer. In this way, the LCD displays a desired image.

Being a passive light-emitting device, an LCD includes both a liquid crystal panel which displays an image, and a backlight assembly which provides light to the liquid crystal panel. The backlight assembly emits light by driving lamps, such as light-emitting diodes (LEDs), using a lamp-driving printed circuit board (PCB). In addition, the backlight assembly drives the LCD by transmitting signals to the liquid crystal panel using the liquid crystal panel-driving PCB.

SUMMARY OF THE INVENTION

As thinner LCDs are increasingly desired, slim-mode LCDs, in which a liquid crystal panel-driving PCB is disposed parallel to a bottom plate of a lower housing to reduce the thickness of the LCDs, are being researched.

However, since circuit devices are mounted on a central part of a liquid crystal panel-driving PCB of a slim-mode LCD, it may be difficult to insert rotary coupling members, such as screws, into the central part of the PCB, as the screws may warp the PCB.

Aspects of the present invention provide a liquid crystal display (LCD) in which warping of a liquid crystal panel-driving printed circuit board (PCB) is reduced.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an LCD including: a liquid crystal panel; a lower housing which accommodates the liquid crystal panel; a lamp-driving printed circuit board (PCB) coupled to the lower housing; a reinforcing member which has a first end fixed to at least one surface of the lamp-driving PCB and a second end separated from the lamp-driving PCB; and a liquid crystal panel-driving PCB comprising a circuit-mounting board disposed outside the lower housing. At least part of the circuit-mounting board is inserted into a space between the lamp-driving PCB and the reinforcing member, so as to be supported by the lamp-driving PCB and the reinforcing member.

According to another aspect of the present invention, there is provided an LCD including: a liquid crystal panel; a lower housing accommodating the liquid crystal panel and comprising a bottom plate, sidewalls which surround the bottom plate, and fixing protrusions which protrude from one of the sidewalls generally parallel to the bottom plate; a lamp-driving PCB comprising a first part fixed to the bottom plate of the lower housing, and a second part extending from the first part; a reinforcing member comprising a first part fixed to at least one surface of the first part of the lamp-driving PCB, and a second part which at least partially overlaps the second part of the lamp-driving PCB; and a liquid crystal panel-driving PCB comprising fixing holes positioned to overlap the fixing protrusions, respectively, and a circuit-mounting board disposed between the fixing holes and outside the lower housing. At least part of the second part of the reinforcing member is separated from the lamp-driving PCB. Also, the fixing holes are coupled to respective ones of the fixing protrusions. Furthermore, at least part of the circuit-mounting board is inserted between the lamp-driving PCB and the reinforcing member, and is at least partially supported by the lamp-driving PCB and the reinforcing member.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In some embodiments, well-known processing processes, well-known device structures and well-known technologies will not be specifically described in order to avoid ambiguous interpretation of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated steps, operations, and/or elements, but do not preclude the presence or addition of one or more other steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
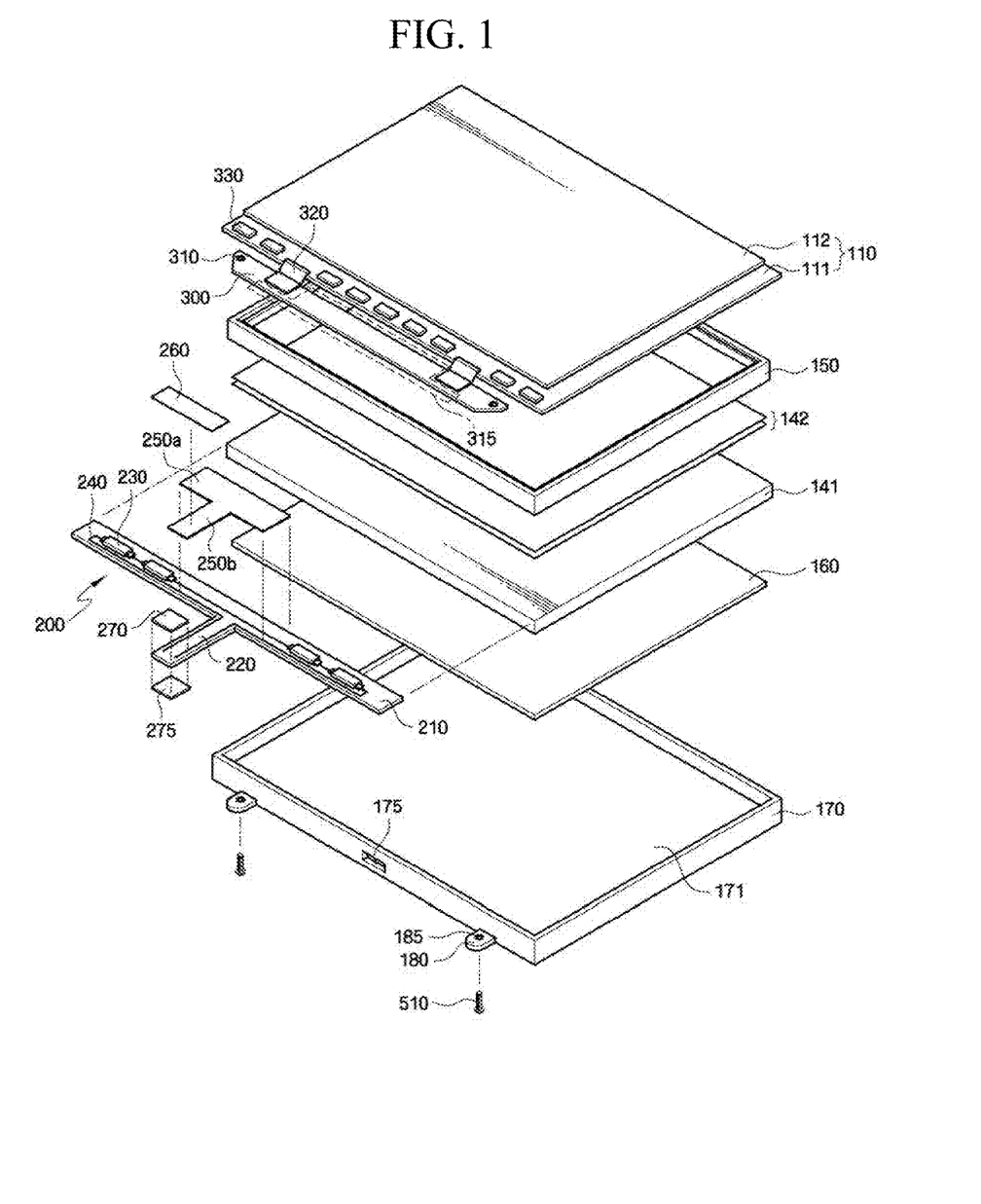
FIG. 1 is an exploded perspective view of a liquid crystal display (LCD) according to a first exemplary embodiment of the present invention.
Figure 2:
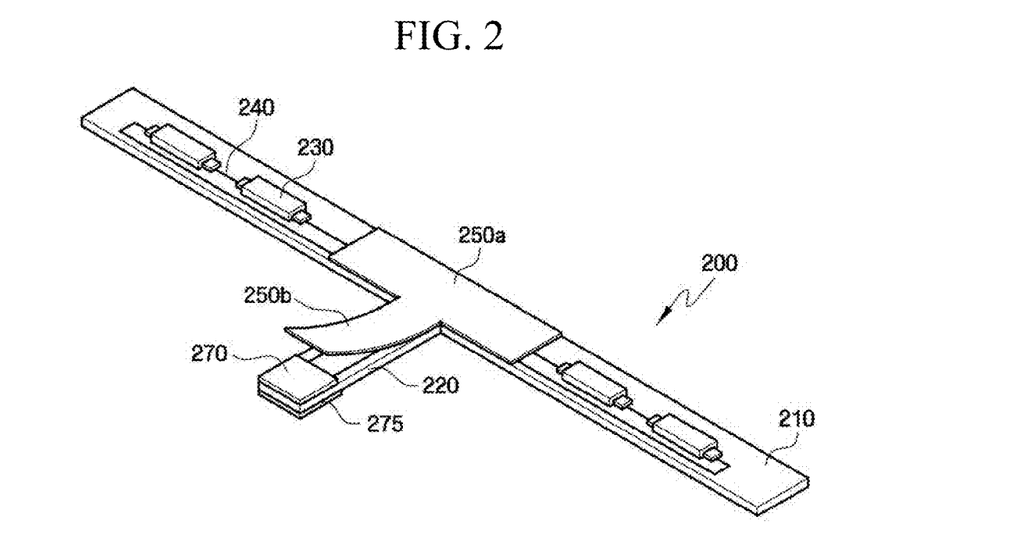
FIG. 2 is a perspective view of a lamp-driving printed circuit board (PCB) included in the LCD according to the first exemplary embodiment of the present invention.
Figure 3:
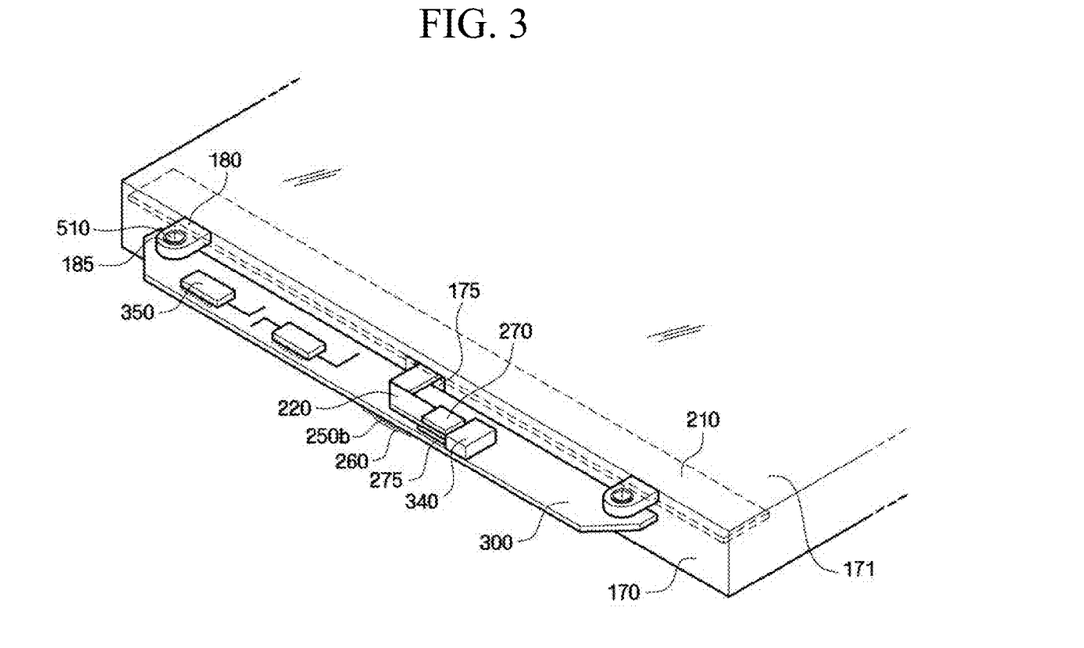
FIG. 3 is a bottom perspective view of the LCD according to the first exemplary embodiment of the present invention.
Figure 4:
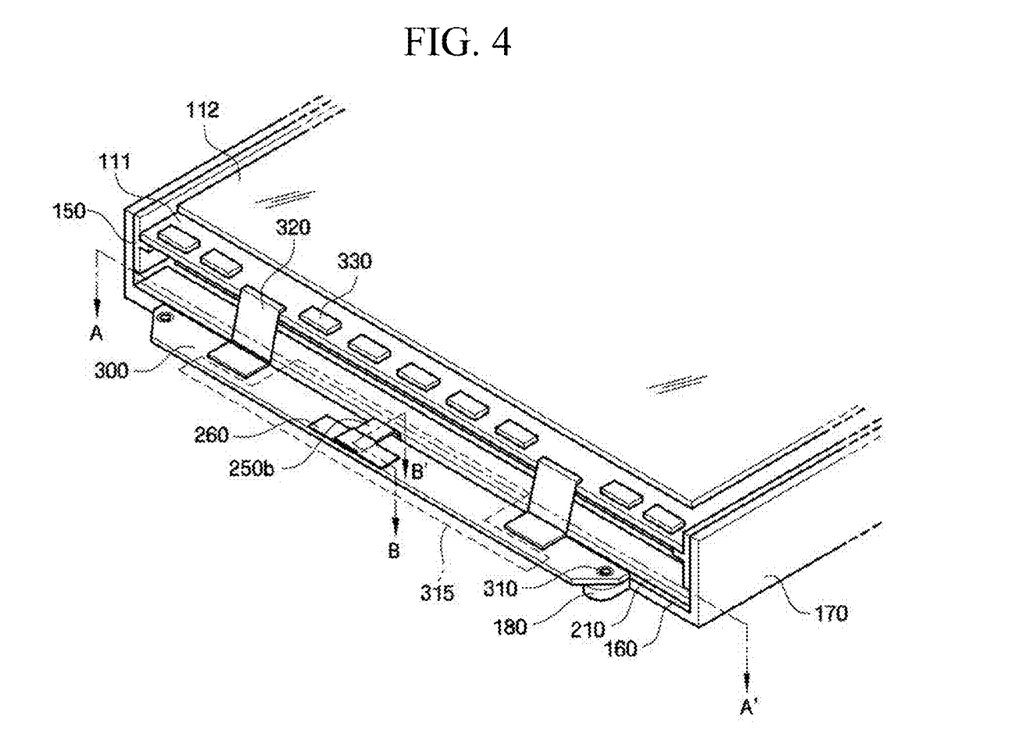
FIG. 4 is a cut perspective view of the LCD according to the first exemplary embodiment of the present invention.
Figure 5:
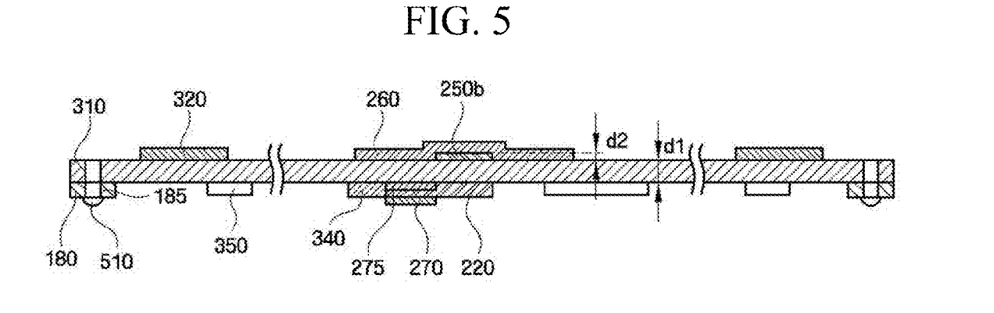
FIG. 5 is a cross-sectional view of the LCD according to the first exemplary embodiment of the present invention, taken along the line A-A' of FIG. 4.
Figure 6:
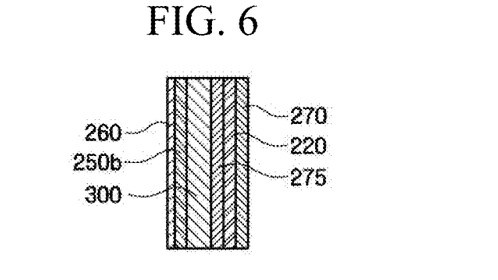
FIG. 6 is a cross-sectional view of the LCD according to the first exemplary embodiment of the present invention, taken along the line B-B' of FIG. 4.

Hereinafter, a liquid crystal display (LCD) according to a first exemplary embodiment of the present invention will be described in detail. FIG. 1 is an exploded perspective view of the LCD according to the first exemplary embodiment of the present invention. FIG. 2 is a perspective view of a lamp-driving printed circuit board (PCB) 200 included in the LCD according to the first exemplary embodiment of the present invention. FIG. 3 is a bottom perspective view of the LCD according to the first exemplary embodiment of the present invention. FIG. 4 is a cut perspective view of the LCD according to the first exemplary embodiment of the present invention. FIG. 5 is a cross-sectional view of the LCD according to the first exemplary embodiment of the present invention, taken along the line A-A' of FIG. 4. FIG. 6 is a cross-sectional view of the LCD according to the first exemplary embodiment of the present invention, taken along the line B-B' of FIG. 4.

Referring to FIG. 1, a liquid crystal panel assembly includes a liquid crystal panel 110 which includes a first substrate 111, a second substrate 112, and one or more polarizers (not shown) disposed between the first and second substrates 111 and 112, liquid crystals (not shown) which are interposed between the first and second substrates 111 and 112, driving integrated circuits (ICs) 330 which are mounted on the first substrate 111, and a liquid crystal panel-driving PCB 300 which transmits signals to the first substrate 111 via chips-on-film (COFs) 320.

Specifically, the liquid crystal panel 110 includes the first substrate 111, the second substrate 112, and the polarizers. The first substrate 111 includes gate lines (not shown), data lines (not shown) and pixel electrodes disposed thereon, and the second substrate 112 includes a black matrix, a color filter and a common electrode disposed thereon and faces the first substrate 111. In addition, one of the polarizers is disposed on a lower surface of the first substrate 111, and the other one of the polarizers is disposed on an upper surface of the second substrate 112. The color filter or the common electrode may also be disposed on the first substrate 111 according to the type of the liquid crystal panel 110.

The substrates of this embodiment of liquid crystal panel 110 are generally flat, board-shaped substrates affixed within an intermediate housing 150 which will be described below. The liquid crystal panel 110 may be composed of a pair of relatively long sides and a pair of relatively short sides. However, the shape of the liquid crystal panel 110 is not limited thereto, but can have any shape suitable for displaying an image.

The driving ICs 330 are integrated onto the first substrate 110 by, e.g., chip-on-glass (COG) technology, and can be connected to the gate lines (not shown) or the data lines (not shown). The driving ICs 330 according to the present embodiment may be arranged parallel to a long side of the liquid crystal panel 110. However, the present invention is not limited thereto. That is, the driving ICs 330 may also be arranged parallel to a short side of the liquid crystal panel 110.

The liquid crystal panel-driving PCB 300 may be connected to the long side of the liquid crystal panel 110 by the COFs 320. The liquid crystal panel-driving PCB 300 includes a circuit-mounting board 315 on which a plurality of circuit devices for inputting gate driving signals and/or data driving signals to the driving ICs 330 are mounted.

The circuit-mounting board 315 is disposed in a central part of the liquid crystal panel-driving PCB 300, and fixing holes 310 are formed in both ends of the liquid crystal panel-driving PCB 300, respectively, which are located outside the circuit-mounting board 315. The fixing holes 310 of the liquid crystal panel-driving PCB 300 are fixed respectively to fixing protrusions 180 of a lower housing which includes sidewalls 170 and a bottom plate 171. Specifically, insertion holes 185 are formed in the fixing protrusions 180 at locations corresponding to the fixing holes 310, respectively, and coupling members 510 penetrate the fixing holes 310 and the insertion holes 185, thereby connecting the liquid crystal panel-driving PCB 300 to the lower housing.

The circuit-mounting board 315 does not overlap the lower housing. That is, the circuit-mounting board 315 is disposed outside the lower housing. Both ends of the liquid crystal panel-driving PCB 300 are fixed to the fixing protrusions 180 of the lower housing such that a surface of the liquid crystal panel-driving PCB 300 is disposed parallel to the bottom plate 171 of the lower housing. That is, the liquid crystal panel-driving PCB 300 connected to the liquid crystal panel 110 according to the present embodiment is not bent in a direction perpendicular to the bottom plate 171 of the lower housing and is not disposed on a lower surface of the lower housing. Therefore, the overall thickness of the LCD is not increased by the width or thickness of the liquid crystal panel-driving PCB 300.

Meanwhile, since various circuit devices are formed on the circuit-mounting board 315 of the present embodiment, the fixing holes 310 are preferably formed off of the circuit-mounting board 315. Furthermore, at least part of the circuit-mounting board 315 is supported by a reinforcing member, which includes a first part 250a and a second part 250b. Both these features help to prevent the central part of the liquid crystal panel-driving PCB 300 from warping.

A backlight assembly includes a light guide plate (LGP) 141, one or more optical sheets 142, a reflective sheet 160, the lamp-driving PCB 200, the intermediate housing 150, and the lower housing which is composed of the sidewalls 170 and the bottom plate 171.

The LGP 141 is received in the lower housing and guides light that is emitted from lamps 230. In order to efficiently guide light, the LGP 141 may be made of a material having light-transmitting properties such as acrylic resin (e.g., polymethyl methacrylate (PMMA)), or a material having a constant refractive index such as polycarbonate (PC).

Light incident upon a side surface of the LGP 141, which is made of the above materials, has an angle less than a critical angle of the LGP 141. Thus, the light is delivered into the LGP 141. When light is incident upon an upper or lower surface of the LGP 141, an angle of incidence of the light is greater than the critical angle. Thus, the light does not exit from the LGP 141. Instead, the light is evenly delivered within the LGP 141.

A diffusion pattern (not shown) may be formed on any one of the upper or lower surfaces of the LGP 141. For example, the diffusion pattern may be formed on the lower surface of the LGP 141 such that light guided by the LGP 141 can travel upward.

The optical sheets 142 are disposed on the upper surface of the LGP 141 to diffuse and concentrate light from the LGP 141. The optical sheets 142 may include a diffusion sheet, a prism sheet, and a protective sheet. The diffusion sheet may be disposed between the LGP 141 and the prism sheet, and may diffuse light from the LGP 141 to prevent the light from being concentrated in a specific area. The prism sheet may have a predetermined array of triangular prisms on a surface thereof and concentrate light, which is diffused by the diffusion sheet, in a direction perpendicular to the liquid crystal panel 110. The protective sheet may be disposed on an upper surface of the prism sheet to protect the upper surface of the prism sheet from any damage. In addition, the protective sheet may diffuse light for more uniform distribution of the light.

The intermediate housing 150 may be a rectangular frame which is composed of four sidewalls and a support platform. The sidewalls of the intermediate housing 150 may be coupled to the sidewalls 170 of the lower housing. The support platform of the intermediate housing 150 may support the liquid crystal panel 110, and also act to press the LGP 141 and the optical sheets 142 against the lower housing so as to fix them to the lower housing.

The intermediate housing 150 may be a mold frame made of, e.g., a plastic material, in order to prevent parts fixed in position by the intermediate housing 150 from being damaged.

To be reflective, the reflective sheet 160 may be made of, e.g., polyethylene terephthalate (PET). In addition, a diffusion layer containing, e.g., titanium dioxide, may be coated on a surface of the reflective sheet 160.

The reflective sheet 160 covers the lower surface of the LGP 141 and reflects light, which is output from the lower surface of the LGP 141 and from side surfaces of the lower housing, in an upward direction (i.e., toward the liquid crystal panel 110). Specifically, the LGP 141 can reflect a small amount of light back toward the reflective sheet 160. The reflective sheet 160 reflects this light (or at least, that portion which has not been reflected by a micro-dot pattern formed on the lower surface of the LGP 141) back toward an exit surface of the LGP 141 again, thereby reducing light loss.

The lower housing includes bottom plate 171 (on which the LGP 141 and the lamps 230 are placed), and sidewalls 170. The sidewalls 170 extend from edges of the bottom plate 171 in a direction substantially perpendicular to the bottom plate 171 and surround the bottom plate 171. Although not shown in the drawing, upper regions of the sidewalls 170 may be bent to accommodate parts or cover the lamps 230.

An outlet hole 175 may be formed in the bottom plate 171 of the lower housing, and the lamp-driving PCB 200 and the reinforcing member, which includes the first and second parts 250a and 250b, may be drawn out through the outlet hole 175.

The fixing protrusions 180 may protrude from one of the sidewalls 170 of the lower housing and be disposed parallel to the bottom plate 171 of the lower housing.

Referring to FIGS. 1 and 2, the lamp-driving PCB 200 of the present embodiment may include a first part 210 disposed parallel to a long side of the bottom plate 171 of the lower housing, and a second part 220 branched off from the first part 210. The lamp-driving PCB 200, which includes the first part 210 and second part 220 branching off from the first part 210, may for example be generally T-shaped, i.e. shaped generally like the English character "T." However, the shape of the lamp-driving PCB 200 is not limited thereto. Indeed, the invention contemplates any suitable shape for lamp-driving PCB 200. More particularly, lamp-driving PCB 200 may have any shape as long as it includes a part fixed to the lower housing and a part connected to the liquid crystal panel-driving PCB 300.

Each of the first and second parts 210 and 220 may include a base film, and wiring formed on the base film. The base film may be made of a resin material, which is flexible, easily bent, and has superior insulating properties, such as polyimide.

The lamps 230 may be mounted on an upper surface of the first part 210 of the lamp-driving PCB 200. The lamps 230 may be line light sources such as light-emitting diodes (LEDs). In this case, the LEDs may be arranged at regular intervals in a lengthwise direction of the circuit-mounting board 315. The LEDs may be white LEDs which emit white light. Alternatively, the LEDs may be an LED package of red, green and blue LEDs which combine to emit white light. As user herein, terms, such as "upper surface," "above" and "on," may be used to describe each device from a viewer' side, and terms, such as "lower surface," "below" and "under," may be used to describe each device from an opposite side to the viewer's side.

The second part 220 of the lamp-driving PCB 200 is drawn out from the lower housing through the outlet hole 175, and is connected to the liquid crystal panel-driving PCB 300.

An end of the reinforcing member is fixed to at least one surface of the lamp-driving PCB 200, to overlap at least part of the lamp-driving PCB 200. The other end of the reinforcing member is separated from the lamp-driving PCB 200.

Specifically, the reinforcing member may include the first part 250a and second part 250b. The first part 250a is fixed to at least one surface of the first part 210 of the lamp-driving PCB 200 to overlap the first part 210 of the lamp-driving PCB 200, while the second part 250b overlaps at least part of the second part 220 of the lamp-driving PCB 200. The second part 250b of the reinforcing member may be separated from the second part 220 of the lamp-driving PCB 200. That is, the first part 250a of the reinforcing member is attached to the first part 210 of the lamp-driving PCB 200, and the second part 250b of the reinforcing member is separated from the second part 220 of the lamp-driving PCB 200 by a predetermined space.

The reinforcing member, which is composed of the first and second parts 250a and 250b, may be shaped generally like the English character "T." However, the present invention is not limited thereto. That is, the reinforcing member can have any shape.

Additional reinforcing members 270 and 275 may be formed on at least one surface of the lamp-driving PCB 200. Specifically, the additional reinforcing members 270 and 275 may be formed on upper and lower surfaces of an end of the lamp-driving PCB 200, respectively. The additional reinforcing members 270 and 275 may serve as a handle when an end of the lamp-driving PCB 200 is connected to a connector 340 (see FIG. 5) of the liquid crystal panel-driving PCB 300.

The LCD of the present embodiment may, optionally, not include an upper housing. Although not shown in the drawings, an insulating film may cover the backlight assembly of this LCD, to further protect it from damage.

The coupling relationship between the lamp-driving PCB 200 and the liquid crystal panel-driving PCB 300 will now be described in detail with reference to FIGS. 3 through 6.

Referring to FIG. 3, the second part 220 of the lamp-driving PCB 200 is drawn out from the lower housing through the outlet hole 175, and disposed on a lower surface of the liquid crystal panel-driving PCB 300. An end of the second part 220 of the lamp-driving PCB 200 may be folded such that the positions of upper and lower surfaces of the end of the second part 220 are reversed. This reversed end may then be connected to the connector 340 that is formed on the lower surface of the liquid crystal panel-driving PCB 300.

The additional reinforcing members 270 and 275 serve as a handle when the second part 220 of the lamp-driving PCB 200 is connected to the connector 340. In addition, the additional reinforcing members 270 and 275 protect the lamp-driving PCB 200 and circuit devices (not shown) formed on the lamp-driving PCB 200.

Circuit devices 350 formed on the lower surface of the liquid crystal panel-driving PCB 300 may be protected by an insulating film (not shown) that can cover the entire LCD if desired.

Referring to FIGS. 4 through 6, the liquid crystal panel-driving PCB 300 is disposed parallel to the bottom plate 171 of the lower housing. In this arrangement, the width of the liquid crystal panel-driving PCB 300 does not increase the overall thickness of the LCD. Therefore, the present embodiment can be used in slim-mode LCDs.

Both ends of the liquid crystal panel-driving PCB 300 are fixed to and overlap the fixing protrusions 180 that protrude from the lower housing. The circuit-mounting board 315 of the liquid crystal panel-driving PCB 300 is inserted into the space by which the second part 220 of the lamp-driving PCB 200 is separated from the second part 250*b* of the reinforcing member. Specifically, the second part 220 of the lamp-driving PCB 200 is disposed on the lower surface of the liquid crystal panel-driving PCB 300, and the second part 250*b* of the reinforcing member is disposed on the upper surface of the liquid crystal panel-driving PCB 300. This helps to prevent warping of the liquid crystal panel-driving PCB 300.

An adhesive film 260 covers at least part of the second part 250*b* of the reinforcing member and at least part of the upper surface of the liquid crystal panel-driving PCB 300, and helps affix the second part 250*b* to PCB 300.

In order to support the liquid crystal panel-driving PCB 300, a thickness d2 of the reinforcing member may be 0.2 to 0.4 times a thickness d1 of the liquid crystal panel-driving PCB 300. When the thickness d2 of the reinforcing member is less than 0.2 to 0.4 times the thickness d1 of the liquid crystal panel-driving PCB 300, the reinforcing member may be too thin and flexible to prevent the warping of the liquid crystal panel-driving PCB 300. Conversely, when the thickness d2 of the reinforcing member is more than 0.2 to 0.4 times the thickness d1 of the liquid crystal panel-driving PCB 300, it may be difficult to place the reinforcing member on the upper surface of the liquid crystal panel-driving PCB 300.

Since the reinforcing member and the lamp-driving PCB 200 are disposed on the upper and lower surfaces of the liquid crystal panel-driving PCB 300, respectively, warping of the liquid crystal panel-driving PCB 300 is reduced without the need for fixing holes 310 in the circuit mounting board 315. In addition, misalignments and disconnections between the lamp-driving PCB 200 and the connector 340 can be prevented.

Figure 7:
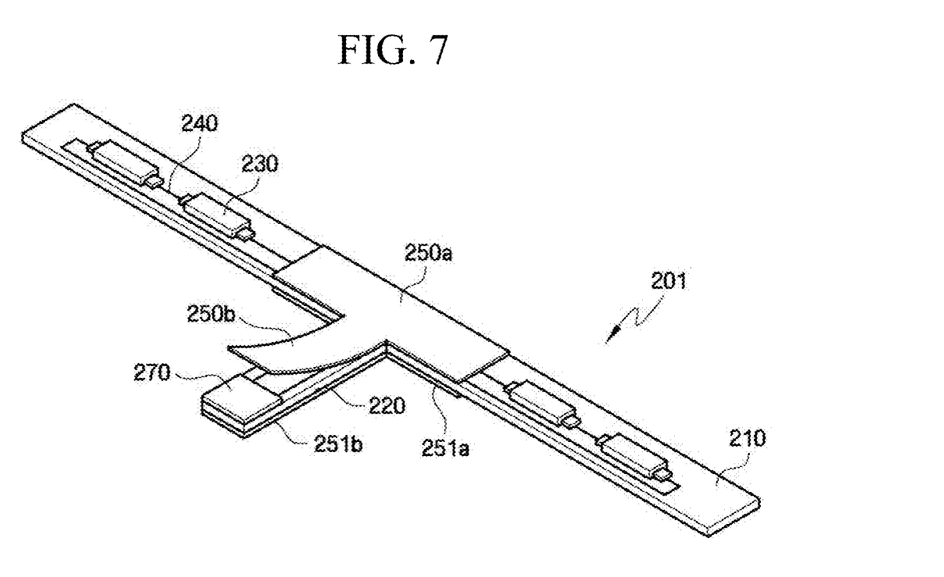
FIG. 7 is a perspective view of a lamp-driving PCB included in an LCD according to a second exemplary embodiment of the present invention.
Figure 8:
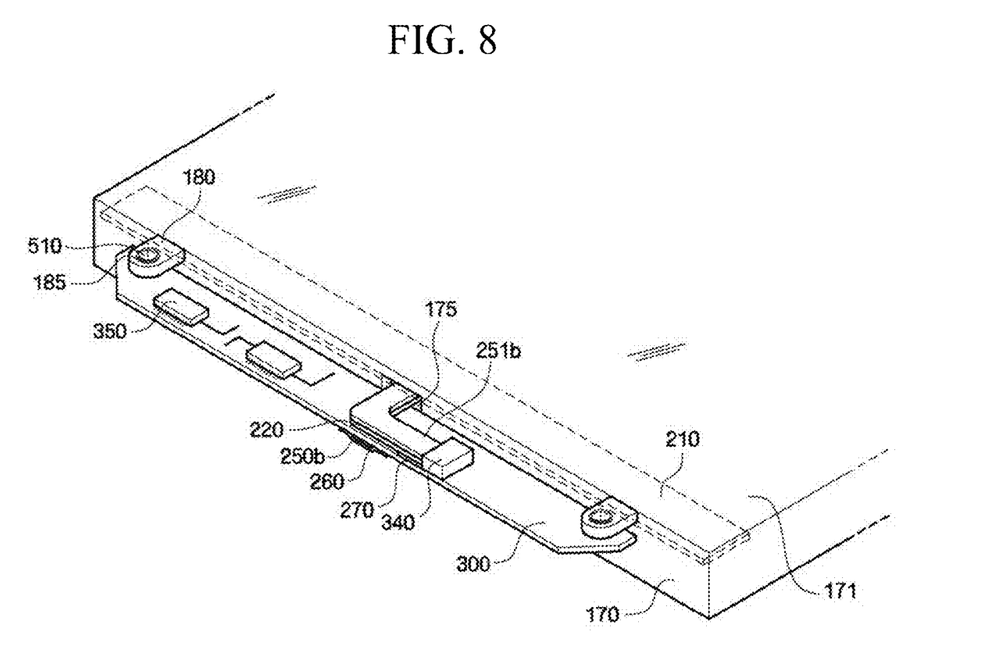
FIG. 8 is a bottom perspective view of the LCD according to the second exemplary embodiment of the present invention.
Figure 9:
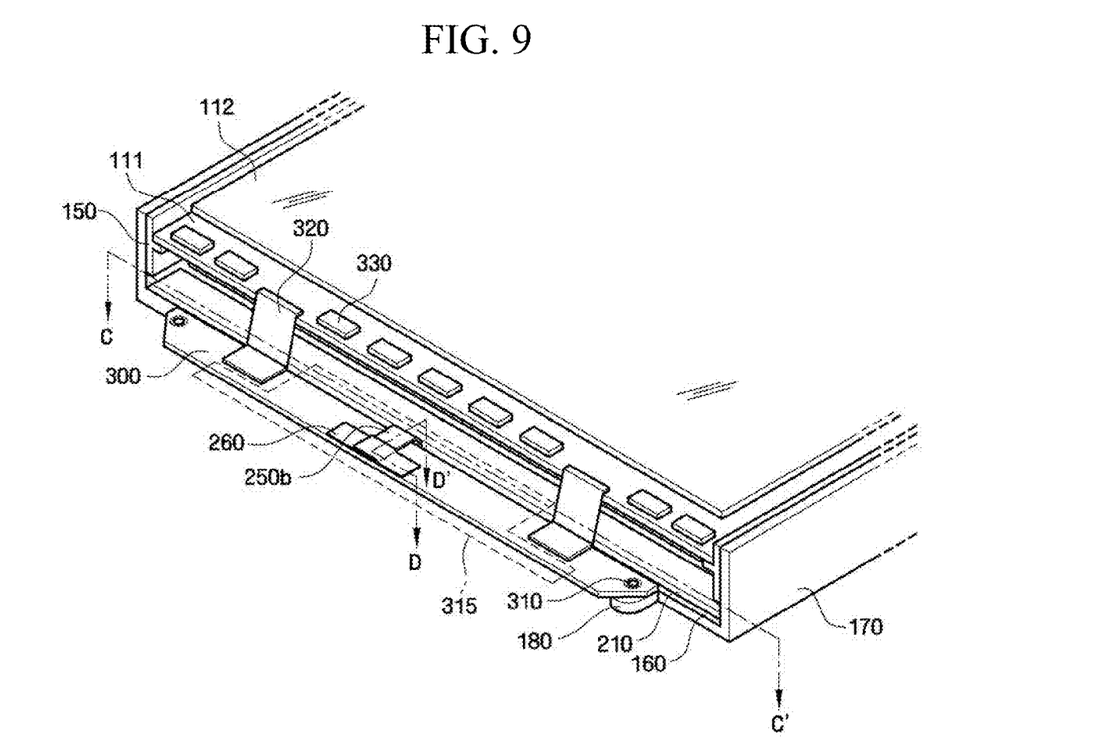
FIG. 9 is a cut perspective view of the LCD according to the second exemplary embodiment of the present invention.
Figure 10:
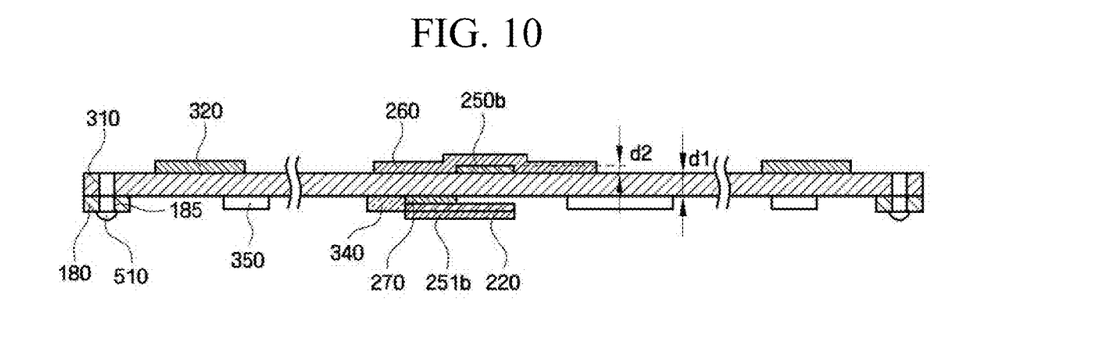
FIG. 10 is a cross-sectional view of the LCD according to the second exemplary embodiment of the present invention, taken along the line C-C' of FIG. 9.
Figure 11:
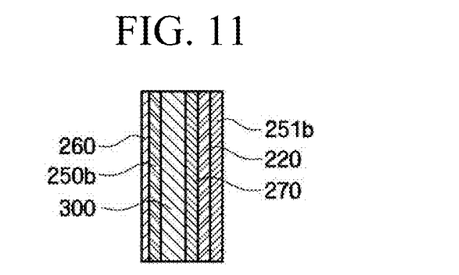
FIG. 11 is a cross-sectional view of the LCD according to the second exemplary embodiment of the present invention, taken along the line D-D' of FIG. 9.

Hereinafter, an LCD according to a second exemplary embodiment of the present invention will be described in detail with reference to FIGS. 7 through 11. FIG. 7 is a perspective view of a lamp-driving PCB 201 included in the LCD according to the second exemplary embodiment of the present invention. FIG. 8 is a bottom perspective view of the LCD according to the second exemplary embodiment of the present invention. FIG. 9 is a cut perspective view of the LCD according to the second exemplary embodiment of the present invention. FIG. 10 is a cross-sectional view of the LCD according to the second exemplary embodiment of the present invention, taken along the line C-C' of FIG. 9. FIG. 11 is a cross-sectional view of the LCD according to the second exemplary embodiment of the present invention, taken along the line D-D' of FIG. 9. Elements substantially identical to those of the first exemplary embodiment are indicated by like reference numerals, and thus their description will be omitted or simplified.

Referring to FIGS. 7 through 11, the LCD of the present embodiment includes a first reinforcing member disposed on a surface of the lamp-driving PCB 201, and a second reinforcing member disposed on the other surface of the lamp-driving PCB 201.

Specifically, the first and second reinforcing members include first parts 250*a* and 251*a*, which are fixed to and overlap a first part 210 of the lamp-driving PCB 201, and second parts 250*b* and 251*b*, which overlap at least part of a second part 220 of PCB 201, respectively.

That is, the second part 250*b* of the first reinforcing member is disposed on an upper surface of a liquid crystal panel-driving PCB 300, and the second part 220 of the lamp-driving PCB 201 and the second part 251*b* of the second reinforcing member are disposed on a lower surface of the liquid crystal panel-driving PCB 300. The upper and lower surfaces of the liquid crystal panel-driving PCB 300 are supported by the second part 250*b* of the first reinforcing member and the second part 251*b* of the second reinforcing member.

The lamp-driving PCB 201 of the present embodiment is bent such that the positions of the upper and lower surfaces of the lamp-driving PCB 201 are not reversed. In addition, the lamp-driving PCB 201 is connected to a connector 340 which is formed on the lower surface of the liquid crystal panel driving-PCB 300. That is, the second part 251*b* of the second reinforcing member and the lamp-driving PCB 201 are bent and disposed on the lower surface of the liquid crystal panel-driving PCB 300 such that the positions of the upper and lower surfaces of the lamp-driving PCB 201 are not reversed. Thus, the area of the PCB 300 that is supported by the second part 251*b* of the second reinforcing member is increased. Accordingly, warping of the PCB 300, on which a circuit-mounting board 315 is mounted, can be prevented more efficiently.

The second part 251*b* of the second reinforcing member may be longer than the second part 250*b* of the first reinforcing member, so as to cover the entire lower surface of the second part 220 of the lamp-driving PCB 201. An additional reinforcing member 270 may be formed on the upper surface of the lamp-driving PCB 201. Since the second part 251*b* of the second reinforcing member is disposed at a position opposite to the additional reinforcing member 270 on the lower surface of the lamp-driving PCB 201, it may function similar to the additional reinforcing member 270.

Figure 12:
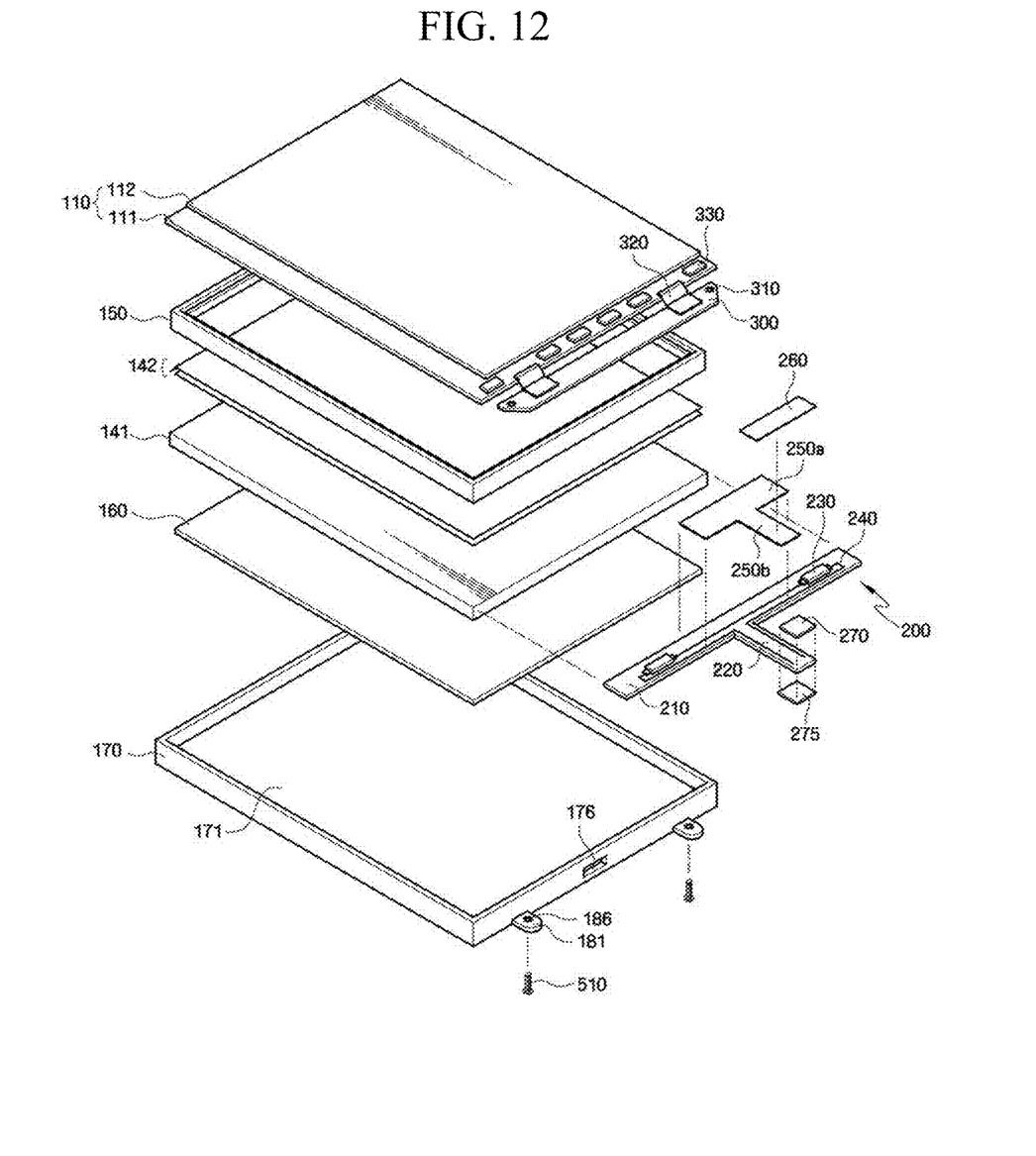
FIG. 12 is an exploded perspective view of an LCD according to a third exemplary embodiment of the present invention.

Hereinafter, an LCD according to a third exemplary embodiment of the present invention will be described in detail with reference to FIG. 12. FIG. 12 is an exploded perspective view of the LCD according to the third exemplary embodiment of the present invention.

Referring to FIG. 12, a liquid crystal panel-driving PCB 300 included in the LCD according to the present embodiment may be disposed parallel to a short side of a liquid crystal panel 110. In addition, COFs 320, which connect a first substrate 111 to the liquid crystal panel-driving PCB 300, and driving ICs 330, which are mounted on the first substrate 111, may be disposed parallel to the short side of the liquid crystal panel 110. Accordingly, the number of driving ICs 330 can be reduced.

A lamp-driving PCB 200 may also be disposed parallel to the short side of the liquid crystal panel 110. That is, the lamp-driving PCB 200 may be disposed at a location corresponding to the liquid crystal panel-driving PCB 300. A reinforcing member according to the present embodiment, which supports the liquid crystal panel-driving PCB 300, may be substantially similar to the reinforcing member(s) of the first or second exemplary embodiment of the present invention.

Fixing protrusions 181 and insertion holes 186 are formed on a short side of the lower housing. In addition, an outlet hole 176 is formed in a shorter one of sidewalls 170 of the lower housing.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display (LCD) comprising:
   a liquid crystal panel;
   a lower housing which accommodates the liquid crystal panel;
   a lamp-driving printed circuit board (PCB) coupled to the lower housing;
   a reinforcing member which has a first end fixed to at least one surface of the lamp-driving PCB and a second end separated from the lamp-driving PCB; and
   a liquid crystal panel-driving PCB comprising a circuit-mounting board disposed outside the lower housing, wherein the circuit-mounting board does not overlap with the lower housing, and
   fixing holes formed in opposite ends of the liquid crystal panel-driving PCB, wherein the lower housing comprises a bottom plate, sidewalls extending from the bottom plate, and fixing protrusions which protrude from at least one of the sidewalls in a direction generally parallel to the bottom plate, wherein the fixing holes are configured to be coupled to the fixing protrusions, and
   wherein at least part of the circuit-mounting board is inserted into a space between the lamp-driving PCB and the reinforcing member, so as to be supported by the lamp-driving PCB and the reinforcing member.

2. The LCD of claim 1, wherein a surface of the liquid crystal panel-driving PCB is disposed parallel to a surface of a bottom plate of the lower housing, and the lamp-driving PCB and the reinforcing member are each generally T-shaped.

3. The LCD of claim 1, wherein a thickness of the reinforcing member is 0.2 to 0.4 times a thickness of the liquid crystal panel-driving PCB.

4. The LCD of claim 1, wherein:
   the lamp-driving PCB comprises a first part fixed to the bottom plate of the lower housing and a second part extending from the first part;
   the reinforcing member comprises a first part fixed to at least one surface of the first part of the lamp-driving PCB so as to at least partially overlie the first part of the lamp-driving PCB, and a second part which overlies at least a portion of the second part of the lamp-driving PCB;
   the second part of the lamp-driving PCB is at least partially disposed on a lower surface of the liquid crystal panel-driving PCB; and
   the second part of the reinforcing member is at least partially disposed on an upper surface of the liquid crystal panel-driving PCB.

5. The LCD of claim 4, further comprising:
   an additional reinforcing member formed on at least one surface of the second part of the lamp-driving PCB; and
   a connector mounted on the lower surface of the liquid crystal panel-driving PCB;
   wherein an end of the second part of the lamp-driving PCB, on which the additional reinforcing member is formed, is connected to the connector.

6. The LCD of claim 1, wherein the reinforcing member comprises a first reinforcing member disposed on a surface of the lamp-driving PCB and a second reinforcing member disposed on an opposite surface of the lamp-driving PCB.

7. The LCD of claim 1, wherein the lower housing further comprises an outlet hole formed in one of the sidewalls, wherein the lamp-driving PCB and the reinforcing member extend from the lower housing through the outlet hole.

8. An LCD comprising:
   a liquid crystal panel;
   a lower housing accommodating the liquid crystal panel and comprising a bottom plate, sidewalls which surround the bottom plate, and fixing protrusions which protrude from one of the sidewalls generally parallel to the bottom plate;
   a lamp-driving PCB comprising a first part fixed to the bottom plate of the lower housing, and a second part extending from the first part;
   a reinforcing member comprising a first part fixed to at least one surface of the first part of the lamp-driving PCB, and a second part which at least partially overlaps the second part of the lamp-driving PCB; and
   a liquid crystal panel-driving PCB comprising fixing holes positioned to overlap the fixing protrusions, respectively, and a circuit-mounting board disposed between the fixing holes and outside the lower housing;
   wherein at least part of the second part of the reinforcing member is separated from the lamp-driving PCB, the fixing holes are coupled to respective ones of the fixing protrusions, and at least part of the circuit-mounting board is inserted between the lamp-driving PCB and the reinforcing member, and is at least partially supported by the lamp-driving PCB and the reinforcing member.

9. The LCD of claim 8, wherein a surface of the liquid crystal panel-driving PCB is disposed generally parallel to a surface of the bottom plate.

10. The LCD of claim 8, wherein a thickness of the reinforcing member is 0.2 to 0.4 times a thickness of the liquid crystal panel-driving PCB.

11. The LCD of claim 8, wherein the lamp-driving PCB and the reinforcing member are generally T-shaped.

12. The LCD of claim 8, wherein the first part of the reinforcing member is at least partially disposed on a surface of the lamp-driving PCB.

13. The LCD of claim 12, wherein the second part of the lamp-driving PCB is at least partially disposed on a lower surface of the liquid crystal panel-driving PCB, and the second part of the reinforcing member is at least partially disposed on an upper surface of the liquid crystal panel-driving PCB.

14. The LCD of claim 13, further comprising an adhesive film covering at least part of an upper surface of the second part of the reinforcing member and at least part of the upper surface of the liquid crystal panel-driving PCB.

15. The LCD of claim 12, further comprising:
an additional reinforcing member formed on at least one surface of the second part of the lamp-driving PCB; and
a connector mounted on the lower surface of the liquid crystal panel-driving PCB;
wherein an end of the second part of the lamp-driving PCB, on which the additional reinforcing member is formed, is connected to the connector.

16. The LCD of claim 8, wherein the reinforcing member comprises a first reinforcing member disposed on a surface of the lamp-driving PCB and a second reinforcing member disposed on an opposite surface of the lamp-driving PCB.

17. The LCD of claim 16, wherein each of the first and second reinforcing members comprises a first part fixed to the first part of the lamp-driving PCB, and a second part which overlies at least part of the second part of the lamp-driving PCB.

18. The LCD of claim 17, wherein the second part of the first reinforcing member is disposed at least partially on the upper surface of the liquid crystal panel-driving PCB, and the second part of the lamp-driving PCB and the second part of the second reinforcing member are disposed at least partially on the lower surface of the liquid crystal panel-driving PCB.

19. The LCD of claim 8, further comprising an outlet hole formed in one of the sidewalls of the lower housing, wherein the second part of the lamp-driving PCB and the second part of the reinforcing member extend from the lower housing through the outlet hole.

20. The LCD of claim 8, wherein the liquid crystal panel comprises first sides and second sides, the first sides being longer than the second sides, and the liquid crystal panel-driving PCB is disposed parallel to one of the first or second sides of the liquid crystal panel.

21. The LCD of claim 20, wherein the lamp-driving PCB and the liquid crystal panel-driving PCB are disposed along the same side of the liquid crystal panel.

* * * * *